US010402704B1

United States Patent
Wu (10) Patent No.: US 10,402,704 B1
(45) Date of Patent: Sep. 3, 2019

(54) OBJECT RECOGNITION WITH ATTRIBUTE-BASED CELLS

(71) Applicant: Amazon Technologies, Inc., Seattle, WA (US)

(72) Inventor: Shuang Wu, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 390 days.

(21) Appl. No.: 14/788,272

(22) Filed: Jun. 30, 2015

(51) Int. Cl.
*G06K 9/62* (2006.01)
*G06K 9/72* (2006.01)

(52) U.S. Cl.
CPC ............. *G06K 9/72* (2013.01); *G06K 9/6212* (2013.01); *G06K 2009/6213* (2013.01); *G06K 2209/01* (2013.01)

(58) Field of Classification Search
CPC .... G06K 2209/01; G06K 9/72; G06K 9/6212; G06K 2209/6213; G06K 2009/6213; G06T 7/10; G06T 7/11; G06T 2207/30176; G06T 7/136
USPC ....... 382/101, 102, 105, 140, 174, 177, 103, 382/173, 181
See application file for complete search history.

(56) References Cited

U.S. PATENT DOCUMENTS

2008/0304746 A1* 12/2008 Nakamura ............. G06K 9/348
382/177

OTHER PUBLICATIONS

Lee, Michael K. "Optical Character Recognition Preparation Using Matlab." 2004.*
Bell et al., "A Non-Linear Filter for Gyroscope-Based Video Stabilization," European Conference on Computer Vision 2014, Available at: https://research.nvidia.com/publication/non-linear-filter-gyroscope-based-video-stabilization, 15 pages, (Sep. 2014).
Dalal et al., "Histograms of Oriented Gradients for Human Detection," International Conference on Computer Vision & Pattern Recognition, Available at: https://hal.inria.fr/inria-00548512/document, 8 pages, (Jun. 2005).
Jain et al., "Object Recognition," Machine Vision Chapter 15, pp. 459-491, Available at: http://www.cse.usf.edu/~r1k/MachineVisionBook/MachineVision.htm, (1995).
Rocha, et al., "Classifiers and Machine Learning Techniques for Image Processing and Computer Vision," Phd Thesis at University of Campinas (Unicamp) Brazil, Available at: http://citeseerx.ist.psu.edu/viewdoc/download?doi=10.1.1.408.5397&rep=rep1&type=pdf, 6 pages, (Mar. 2009).
Xue, "Optical Character Recognition," University of Michigan EECS 451, Available at: http://web.eecs.umich.edu/~girasole/teaching/451/2014fall/gradprojects/optical_character_recognition_final_report.pdf, 5 pages, (2014).

* cited by examiner

*Primary Examiner* — Geoffrey E Summers
(74) *Attorney, Agent, or Firm* — K&L Gates LLP (57) ABSTRACT

Various examples are directed to methods and systems for object recognition in an image. A computer vision system may receive a patch comprising a plurality of pixels arranged in a grid. The computer vision system may determine a plurality of columns and a plurality of rows in the patch. The plurality of columns may be based at least in part on a column target sum and the plurality of rows may be based at least in part on a row target sum.

12 Claims, 10 Drawing Sheets

OBJECT RECOGNITION WITH ATTRIBUTE-BASED CELLS

BACKGROUND

Computer vision has a wide range of uses in photography, document processing, manufacturing, and other areas. A common function of computer vision systems is to identify or recognize objects that appear in an image. In photographic processing, for example, computer vision systems may identify people, faces, etc. In manufacturing, computer vision systems may identify manufactured articles, often including defects in the articles. In document processing, computer vision systems may identify letters or words in a process often referred to as optical character recognition (OCR).

Many common computer vision systems identify objects in a test image by applying classifiers. Classifiers describe image properties known to correspond to a particular object type (e.g., a car, a face, a particular letter or other character, etc.). If properties of the test image correlate to the classifier, then the computer vision system concludes that the test image shows an example of the object type. For example, if the properties of an image correlate to a classifier for a car, then the computer vision system may conclude that the test image shows a car. The performance of object classifiers, however, can be compromised if the appearance of an object in a test image is translated or distorted.

DETAILED DESCRIPTION

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for recognizing objects in an image or portion thereof using attribute-based cells. A computer vision system may receive an image including a set of pixels arranged in a grid. Each pixel may be described by one or more pixel attributes. Examples of pixel attributes may include color (e.g., black/white, grayscale, RGB values, etc.), binary state (e.g., asserted, not asserted), gradient vector, intensity magnitude, gradient magnitude, etc. The computer vision system may consider pixel attributes to divide the image (and/or a patch selected from the image) into cells. For example, the grid may have an x direction and a y direction. The computer vision system may describe the cells in any suitable manner. In some examples, cells may be described by column boundaries and row boundaries. Also, in some examples, cells may be described by ranges of positions in the pixel grid. Cells may define on the pixel grid a set of one or more columns and a set of one or more rows.

The computer vision system may create attribute-based cells by equalizing (or approximately equalizing) the sum of pixel attributes in columns and rows of the patch. For example, the sum of pixel attributes in each column may be equal (or approximately equal). Similarly, the sum of pixel attributes in each row may be equal or approximately equal. The sum of pixel attributes in each column may, but need not, match the sum of pixel attributes in each row. In general, the terms "row" and "column" are used with reference to the axes of the pixel grid. For example, rows may be parallel to the x-axis of the pixel grid and columns may be parallel to the y-axis of the pixel grid. Various examples described herein apply attribute-based cells to a patch. A patch may be a set of pixels making up all or a portion of an image captured by an image sensor. A patch, in some examples, is a complete image. In some examples, a patch may be a subset of an image, with one or more patches selected from an image.

Attribute-based cells may be used to recognize any suitable object. For example, in the context of optical character recognition, cells may be created based on a binary state of pixels. For example, the computer vision system or other suitable processing device may binarize a patch. Binarizing a patch may include classifying pixels of the patch as being part of object to-be-detected (e.g., the pixel is asserted) or not part of the object to-be-detected (e.g., the pixel is not asserted. In the context of optical character recognition, pixels that are part of a letter or other character may be asserted while pixels that not part of the latter or other character may be un-asserted or not asserted. The computer vision system may divide the image into cells so as to equalize (or approximately equalize) the total number of asserted pixels in each column and that equalize (or approximately equalize) the total number of asserted pixels in each row. In another example, the computer vision system may create attribute-based cells considering a gradient vector describing a difference in color, brightness, etc. between a pixel and adjacent pixels. The computer vision system may divide the image into cells so as to equalize (or approximately equalize) the sum of gradient vectors for pixels in each column (e.g., the sum of the magnitude of gradient vectors) and the sum of gradient vectors for pixels in each row. Again the sum of gradient vectors for pixels in each column may, but need not, be equal to the sum of gradient vectors for pixels in each row.

After creating cells, the computer vision system may determine a descriptor for the patch. A descriptor for a patch may be a characterization of the patch created considering the individual cells. One example descriptor that may used is a Histogram of Oriented Gradients (HOG) descriptor. Finding an HOG descriptor may comprise finding a histogram of gradient directions for each cell making up the patch. The cell histograms may be concatenated to find the HOG descriptor. Other suitable descriptors that may be utilize attribute-based cells include scale-invariant feature transform (SIFT) descriptors, or any other descriptor that is found considering properties of multiple cells making up a patch. The computer vision system may pass the cell boundaries or other cell definition to the descriptor algorithm in any suitable manner. For example, the descriptor algorithm may be implemented as a function. The computer vision system may call the descriptor algorithm function and pass the cell definitions to the descriptor algorithm as an argument of the function. Also, for example, the computer vision system may write the cell boundaries or other cell definition to a memory location where it may be accessed by the descriptor algorithm. Descriptors for different patches may be used to train classifiers, as described herein. If previously-trained classifiers are available, the descriptors may be used to apply the classifiers to identify characters or other objects in the images. Any suitable classifiers can be used including, for example, Support Vector Machine (SVM) classifiers, decision tree classifiers, random forest classifiers, neural network classifiers, etc.

Figure 1:
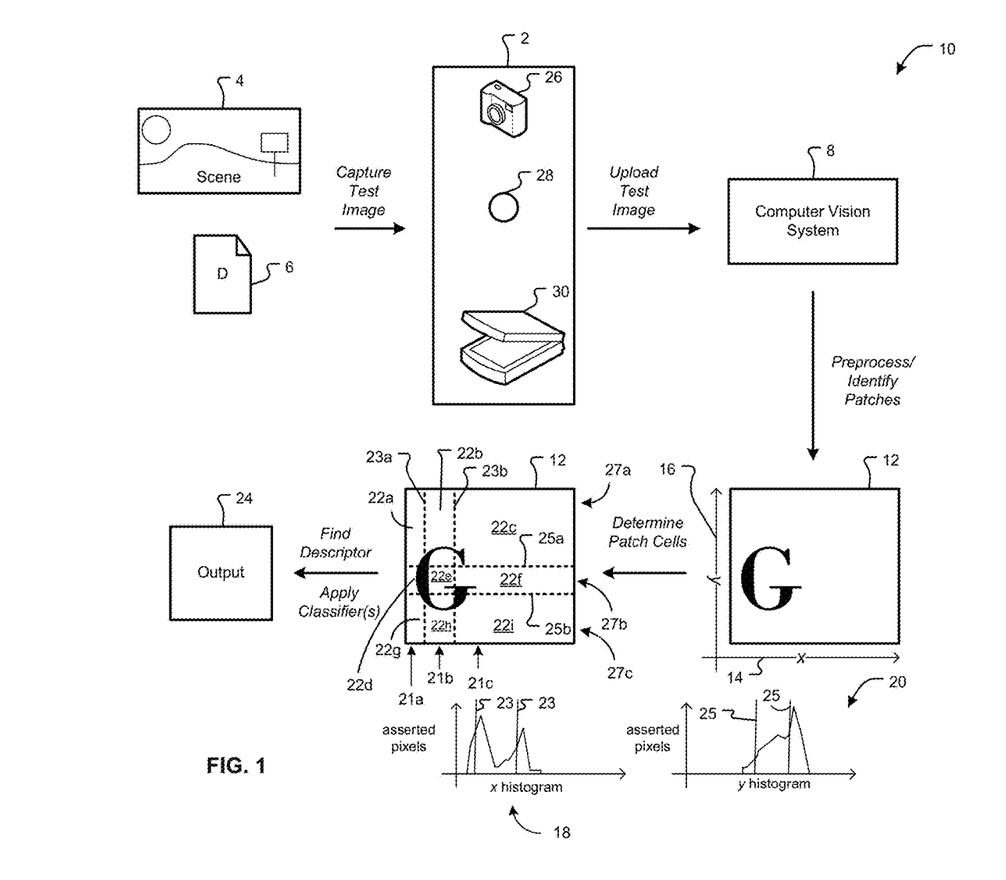
FIG. 1 is a diagram showing one example of a work flow for performing object recognition using attribute-based cells.

FIG. 1 is a diagram showing one example of a work flow 10 for performing object recognition using attribute-based cells. An image capture device 2 may capture an image. The image may be a still image and/or may be a frame from selected from a video. Image capture devices 2 may include any suitable type of image sensor and associated optics. Examples of image capture devices 2 include digital cameras 26, panoramic camera systems 28, and scanners 30. The captured image may depict any suitable thing. For example, the image may depict a scene 4 and/or a document 6. The image may be provided to a computer vision system 8. The computer vision system 8 may be external to the image capture device 2 or, Optionally, one or more image capture devices 2 may upload the image to a computer vision system 8 that may perform object recognition on the image. (In some examples, the image capture device 2 may be programmed to perform object recognition, as described herein, onboard without the need to upload the image.)

The computer vision system 8 may perform preprocessing on the image. Preprocessing may include any suitable processing to prepare the image for object recognition. When optical character recognition (OCR) is to be performed, for example, pre-processing may include binarization, line detection, character segmentation, etc., as described in additional detail herein. Other pre-processing activities may include gamma modification or normalization, color modification or normalization, etc. In the example of FIG. 1, the computer vision system 8 performs OCR and the result of pre-processing is a binarized patch 12 comprising a single character. The patch 12 comprises a grid of pixels oriented relative to an x-axis 14 and a y-axis 16. In some examples, (e.g., when the patch is binarized during pre-processing) each pixel in the patch may be have a value corresponding to asserted (e.g., part of the character) or not asserted (e.g., not part of the character).

The computer vision system 8 may divide the patch into cells based on the patch attributes. In the example of FIG. 1, the patch 12 is divided into cells 22a, 22b, 22c, 22d, 22e, 22f, 22g, 22h, 22i based on asserted pixels. For example, the computer vision system 8 may determine the cells 22a, 22b, 22c, 22d, 22e, 22f, 22g, 22h, 22i so as to equalize or approximately equalize the number of asserted pixels in each column 21a, 21b, 21c, and row 27a, 27b, 27c. For example column 21a may include cells 22a, 22d, and 22g. Column 21b may include cells 22b, 22e, and 22h. Column 21c may include cells 22c, 22f, and 22i. Also, for example, row 27a may include cells 22a, 22b, and 22c. Row 27b may include cells 22d, 22e and 22f. Row 27c may include cells 22g, 22h, 22i. FIG. 1 shows just one example of how a patch 12 may be divided into cells. Any suitable number of cells 22a, 22b, 22c, 22d, 22e, 22f, 22g, 22h, 22i may used. In the example of FIG. 1, columns 21a, 21b, 21c are divided by column boundaries 23a, 23b set along the x-axis 14. Column boundary 23a may divide column 21a from column 21b. Column boundary 23b may divide columns 21b and 23c. Similarly, rows 27a, 27b, 27c are divided by row boundaries 25a, 25b set along the y-axis 16. Row boundary 25a may divide rows 27a and 27b. Row boundary 25b may divide rows 27b and 27c. In some examples, boundaries 23a, 23b, 25a, 25b, indicate a position on the pixel grid between pixels on the pixel grid that are part of one column or row and pixels on the pixel grid that are part of an adjacent column or row. The computer vision system 8 may store indications of the respective boundaries 23a, 23b, 25a, 25b at its memory, for example, as described herein. In various examples, rows, columns and cells may be described in any suitable manner. For example, rows, columns and cells may be described in terms of boundaries there between, as shown in FIG. 1. In various examples, rows, boundaries, or cells may be described by a range in pixel grid of the patch. For example, rather than being described by the boundary 23a, column 21a may be described by a start position and an end position on the x-axis.

FIG. 1 shows an x histogram 18 showing the distribution of asserted pixels along the x-axis 14 and a y histogram 20 showing the distribution of asserted pixels along the y-axis 16. The computer vision system 8 may generate the cells 22a, 22b, 22c, 22d, 22e, 22f, 22g, 22h, 22i such that the area under the x histogram between column boundaries 23a, 23b is equal or approximately equal. In other words, the number of asserted pixels in each column 21 may be equal or approximately equal. Similarly, the computer vision system 8 may generate the cells 22a, 22b, 22c, 22d, 22e, 22f, 22g, 22h, 22i such that the area under they histogram 20 between each boundary 25a, 25b is equal or approximately equal (e.g., the number of asserted pixels in each row 27a, 27b, 27c may be equal or approximately equal). To illustrate this, row and column boundaries 23a, 23b, 25a, 25b are shown both on the respective histograms 18, 20 and superimposed on the patch 12. Although the histograms 18, 20 of FIG. 1 show a distribution of asserted pixels by position, when another pixel attribute is used, rows and columns may be determined based on the sum of pixel attributes over pixels at various x-axis and y-axis positions, as described herein. The computer vision system 8 may equalize or approximately equalize the sum of pixel attributes in the columns and rows in any suitable manner. Examples for equalizing or approximately equalizing the sum of pixel attributes in the columns and rows are described herein, for example, with respect to FIGS. 6 and 7. Also, the patch 12 is divided into nine (9) cells 22a, 22b, 22c, 22d, 22e, 22f, 22g, 22h, 22i including three columns: 23a, 23b, 23c and three rows: 27a,

27b, 27c. In various examples, however, any suitable number of cells, rows or columns may be used.

The computer vision system 8 may find a descriptor for the patch 12 considering the attributes of the various cells 22a, 22b, 22c, 22d, 22e, 22f, 22g, 22h, 22i and apply a classifier to the patch 12 considering attributes of the cells 22a, 22b, 22c, 22d, 22e, 22f, 22g, 22h, 22i. For example, when a HOG descriptor is used, the computer vision system may find a histogram of gradient directions for each cell 22a, 22b, 22c, 22d, 22e, 22f, 22g, 22h, 22i and then concatenate the histograms to find the cell descriptor. Other patch descriptors may be used including, for example, the SIFT descriptor described herein. The output 24 may be an indication of a character shown in the patch 12. For example, the computer vision system 8 may apply the classifier to find a character or other object that most closely matches the descriptor. The output 24 may be an indication of the character associated with the matched classifier or classifiers. In the example of FIG. 1, a classifier may determine that the descriptor of the patch 12 corresponds to descriptors known to indicate the letter "G". Also, in the example of FIG. 1, attribute-based cells 22a, 22b, 22c, 22d, 22e, 22f, 22g, 22h, 22i are applied to a patch 12 that is a subset of pixels selected from a larger image. In some examples, attribute-based cells similar to cells 22a, 22b, 22c, 22d, 22e, 22f, 22g, 22h, 22i may be applied to a complete image. Additionally, although the example of FIG. 1 shows attribute-based cells used to recognize an object in a test image, attribute-based cells may also be used to train classifiers based on training images, as described herein.

Figure 2:
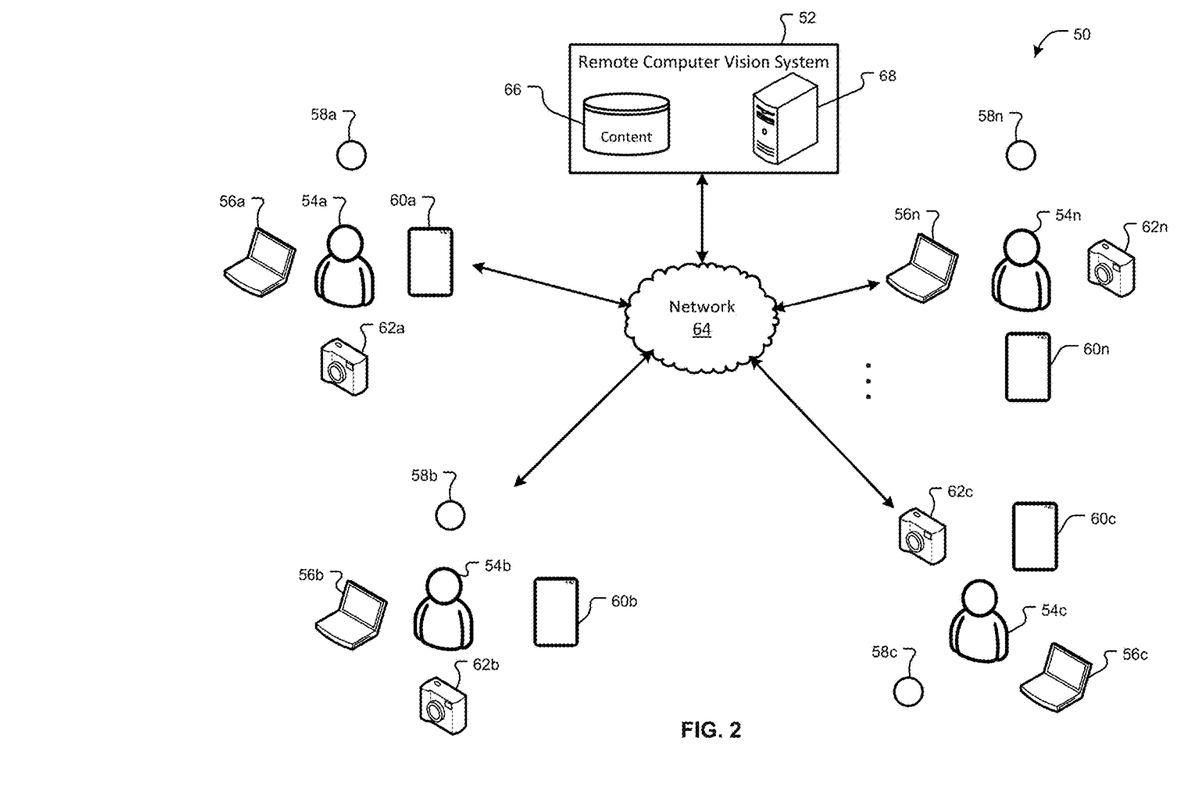
FIG. 2 is a diagram showing one example of an environment for performing object recognition using attribute-based cells.

FIG. 2 is a diagram showing one example of an environment 50 for performing object recognition in an image using attribute-based cells. The environment 50 comprises a remote computer vision system 52 and users 54a, 54b, 54c, 54n. Each user 54a, 54b, 54c, 54n may use one or more user devices such as, for example, panoramic camera systems 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 2 is associated with a panoramic camera system 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture images and/or videos, transmit images and/or videos to the remote computer vision system 52, and/or perform object recognition as described herein. Panoramic camera systems 58a, 58b, 58c, 58n may include one or more image sensors and associated optics to capture panoramic images and/or panoramic videos. Panoramic camera systems 58a, 58b, 58c, 58n may have a panoramic field-of-view that may be, for example, 360° and/or 4π steridans. In some examples, a panoramic camera system 58a, 58b, 58c, 58n may comprise a single image sensor with lenses, mirrors or other optics allowing the single image sensor to receive electromagnetic radiation (e.g., light) from the panaromic field-of-view. In some examples, a panoramic camera system 58a, 58b, 58c, 58n may comprise multiple cameras (e.g., with overlapping fields-of-view). The panoramic camera system 58a, 58b, 58c, 58n (or another component of the environment 50) may be configured to stitch frames from the respective image sensors into a single panoramic image and/or video. In some examples, panoramic camera systems 58a, 58b, 58c, 58n may be configured to communicate with other components of the environment 50 utilizing, for example, a wired or wireless connection. For example, a panoramic camera system 58a, 58b, 58c, 58n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera system 58a, 58b, 58c, 58n may be configured to upload images and/or video directly to a remote computer vision system 52, for example, via the network 64. Also, in some examples, a panoramic camera system 58a, 58b, 58c, 58n may comprise a processor and/or other components to implement object recognition, as described herein.

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote computer vision system 52, for example, via the network 64. Also, in some examples, a digital camera 62a, 62b, 62c, 62n may comprise a processor and/or other components to implement object recognition, as described herein.

A mobile device 60a, 60b, 60c, 60n may be any suitable type of computing device comprising a processor and data storage. In some examples, a mobile device 60a, 60b, 60c, 60n may be configured to receive images and/or video captured by a panoramic camera system 58a, 58b, 58c, 58n or digital camera 62a, 62b, 62c, 62n and transfer the images and/or video for object recognition at the remote computer vision system 52. In some examples, a mobile device 60a, 60b, 60c, 60n may be configured to receive images and/or video captured by a panoramic camera system 58a, 58b, 58c, 58n or digital camera 62a, 62b, 62c, 62n and perform image recognition on the images and/or videos. Also, in some examples, a mobile device 60a, 60b, 60c, 60n may comprise one or more image sensors and associated optics for capturing images and/or video and either uploading the images and/or video to the remote computer vision system 52 or performing object recognition. In some examples, a mobile device 60a, 60b, 60c, 60n may be configured to communicate on a cellular or other telephone network.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive images and/or video captured by a panoramic camera system 58a, 58b, 58c, 58n or digital camera 62a, 62b, 62c, 62n and transfer the images and/or video for object recognition at the remote computer vision system 52. In some examples, a computing device 56a, 56b, 56c, 56n may be configured to receive images and/or video captured by a panoramic camera system 58a, 58b, 58c, 58n or digital camera 62a, 62b, 62c, 62n and perform image recognition on the images and/or videos. Also, in some examples, a computing device 56a, 56b, 56c, 56n may comprise one or more image sensors and associated optics for capturing images and/or video and either uploading the images and/or video to the remote computer vision system 52 or performing object recognition.

The optional remote computer vision system 52 may perform object recognition on images and/or videos received from users 54a, 54b, 54c, 54n (e.g., user devices associated with the user), as described herein. The remote computer vision system 52 may comprise one or more data stores 66 and one or more servers 68. The data store 66 may store videos and/or images received from the various user devices, classifiers, descriptors and/or other data associated with object recognition as described herein. The various components 68, 66 of the remote computer vision system 52 may be at a common geographic location and/or may be distributed across multiple geographic locations. For example, the remote computer vision system 52 may be implemented in whole or in part as a cloud or Software as a Service (SaaS) system. In some examples, the remote computer vision system 52 may perform object recognition on images received from multiple different users 54a, 54b, 54c, 54n (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 3:
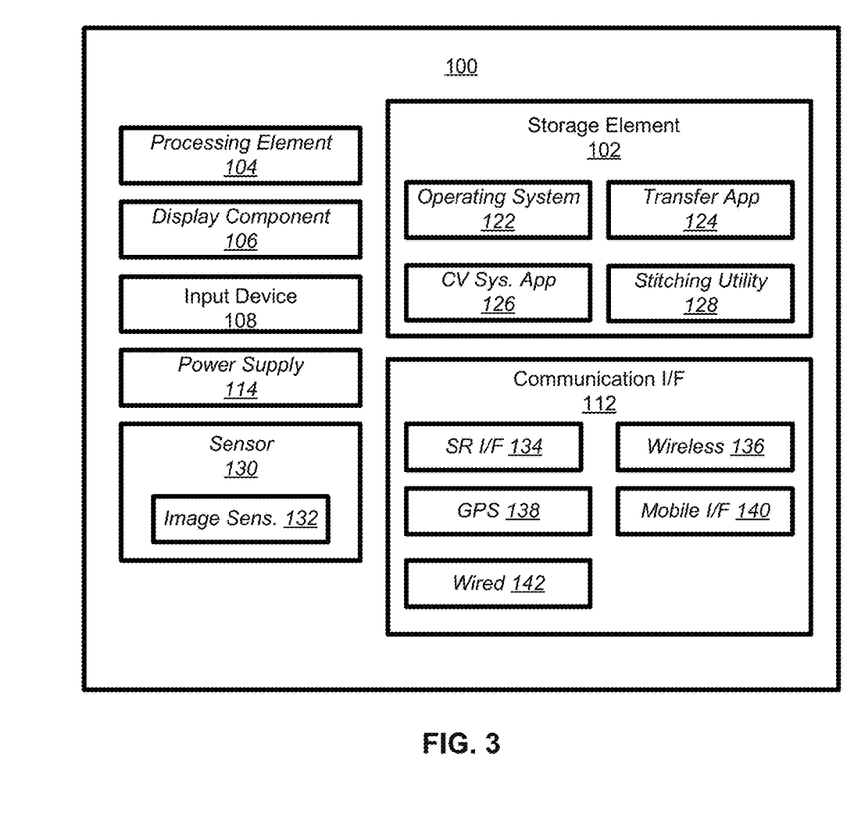
FIG. 3 is a diagram showing an example architecture of a user device.

FIG. 3 is a block diagram showing an example architecture 100 of a user device, such as the user devices described herein above. It will be appreciated that not all of the user devices described herein will include all of the components of the architecture 100 and some of the user devices described herein may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive images and/or video from another device (e.g., a panoramic camera system or digital camera) or from an image sensor 132 included in the architecture 100. In some examples, the transfer application 124 may also be configured to upload the received images and/or videos to another device that may perform object recognition as described herein (e.g., a mobile device, another computing device, or a remote computer vision system 52). In some examples, a computer vision system application 126 may perform object recognition on videos and/or images received from an image sensor of the architecture 100 and/or from another device. The computer vision system application 126 may be included, for example, at a panoramic camera system, a digital camera, a mobile device or another computer system. In some examples, where object recognition is performed by a remote computer vision system, the computer vision system application 126 may be omitted. A stitching utility 128 may stitch images and/or videos received from multiple image sensors into a single image and/or video. The stitching utility 128 may be included, for example, in a panoramic camera system and/or a mobile device or other computing device receiving input from a panoramic camera system.

When implemented in some user devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, accelerometer, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging. The architecture 100 may also include one or more sensors 130. An example sensor is an image sensor 132. Some examples of the architecture 100 may include multiple image sensors 132. For example, a panoramic camera system may comprise multiple image sensors 132 resulting in multiple images and/or video frames that may be stitched to form a panoramic output. Other example sensors 130 may include a gyro sensor, an accelerometer, etc.

The architecture 100 may also include a communication interface 112, comprising one or more wired or wireless components operable to communicate with one or more other user devices and/or with the remote computer vision system 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

Figure 4:
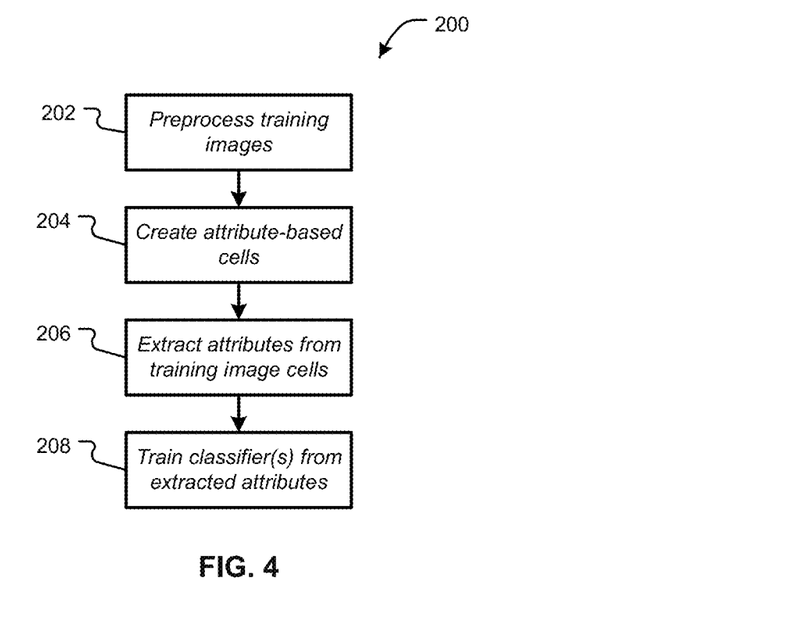
FIG. 4 is a flow chart showing one example of a process flow that may be executed by a computer vision system to train one or more classifiers utilizing attribute-based cells.

FIG. 4 is a flow chart showing one example of a process flow 200 that may be executed by a computer vision system to train one or more classifiers utilizing attribute-based cells. At 202, the computer vision system may preprocess training images. Training images may be images that are known to depict a particular object. In the context of OCR, training images may be images known to depict a particular character or word. In other examples, training images may be known to depict human faces, people walking, cars, particular alphanumeric characters and/or other objects. The computer vision system may receive training images from any source or sources including, for example, image capture devices 2, image libraries, etc.

Any suitable preprocessing may be performed including, for example, gamma modification or normalization, color modification or normalization, etc. In examples where OCR is performed, preprocessing may include one or more of binarization, line detection, and/or character segmentation. Binarization may include classifying pixels in the image as asserted (e.g., part of a character) or not asserted (e.g., background or part of a non-character object). Binarization may be performed in any suitable manner. For example, in a greyscale image, pixels having a greyscale value above a threshold may be classified as asserted while pixels having a greyscale value below the threshold may be considered not asserted. Color images may be converted to greyscale for binarization or may be binarized with another suitable algorithm. Line detection may involve identifying lines of text in the training image. For example, the training image may be a scan of a document including text, a photograph of a road sign or other object including text, etc. Any suitable line detection technique may be used. For example, the computer vision system may look for horizontal rows of pixels that are not asserted. When such horizontal rows of pixels are found, they may be considered a boundary between lines of text. Character segmentation may involve dividing the identified lines into patches, where each patch contains a single or set number of letters or other characters. Any suitable character segmentation technique may be used including, for example, Maximal Stable Extremal Regions (MSER) for defining character glyph contours. Also, for example, the computer vision system may look for vertical columns of pixels in the patch that not asserted. These columns may be considered to divide two patches. Patches may be delineated in the vertical or y direction by the lines detected by the line detection process(es) and may be delineated in the horizontal or x direction by the boundaries found by the character segmentation process.

At 204, the computer vision system may create attribute-based cells in the image, as described herein. When the image is segmented into multiple character patches, similar to the example of FIG. 1, attribute-based cells may be found for each patch separately. At 206, the computer vision system may extract attributes from the cells and find a descriptor for each image or patch selected from an image. Any suitable descriptor may be used including the examples described herein. At 208, the computer vision system may train one or more classifiers based on the descriptors of the cells found at 206. For example, a classifier may be trained to recognize the known object from the test image. Training a classifier may involve determining a matching score between different descriptors known to include the same object (e.g., descriptors in the same class). For example, the computer vision system may find a statistical distribution of descriptors for a class of images or patches. When the classifier is applied to test images or patches, the computer vision system may test descriptors of the test images or patches thereof against the classifier to determine the class of the test image or patch.

Figure 5:
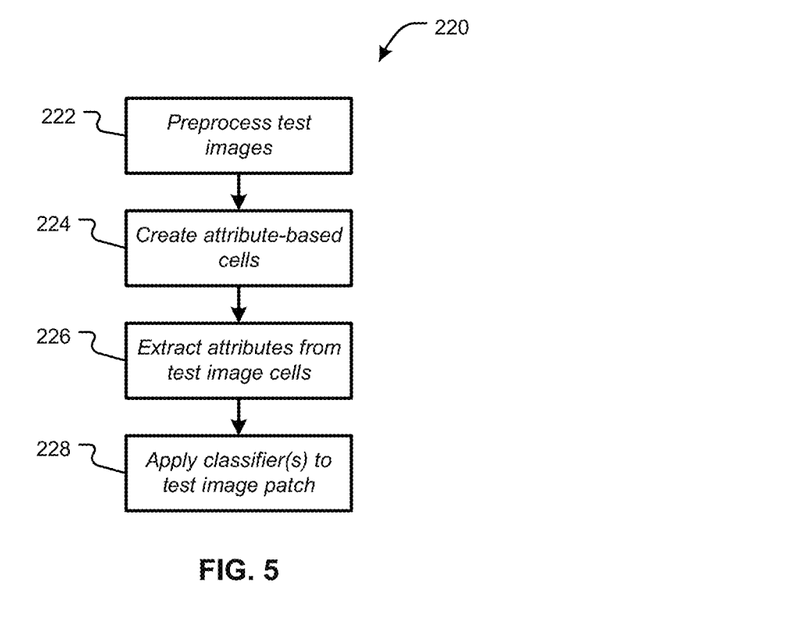
FIG. 5 is a flowchart showing one example of a process flow that may be executed by a computer vision system to recognize objects utilizing attribute-based cells.

FIG. 5 is a flowchart showing one example of a process flow 220 that may be executed by a computer vision system to recognize objects utilizing attribute-based cells. At 222, the computer vision system may preprocess test images. A test image, for example, may be an image that depicts one or more objects that are unknown to the computer vision system. Test images may be preprocessed, for example, in a manner similar to that described herein with respect to 202. For example, when the computer vision system is performing OCR, the result of the preprocessing may be a set of one or more binarized patches, where each patch corresponds to a letter or other character. At 224, the computer vision system may create attribute-based cells, as described herein. When patches are extracted from the test image, in some examples, each patch may be divided into attribute-based cells. In some examples, the test image as a whole may be divided into cells. At 226, the computer vision system may extract attributes from the cells and find a descriptor of the full image or patch based on the cell attributes. Any suitable descriptor may be used, as described herein. At 228, the computer vision system may apply a classifier to the image or patch. The classifier may have been previously trained, for example, as described herein. Applying the classifier may comprise finding a class for an image or patch based on similarities between the descriptor of the image or patch and descriptors known to correspond to different objects. In some examples, the computer vision system may determine the classifier or classifiers that best fit the descriptors of the cells. An object associated with that classifier or classifiers may be depicted by the image or patch.

Figure 6:
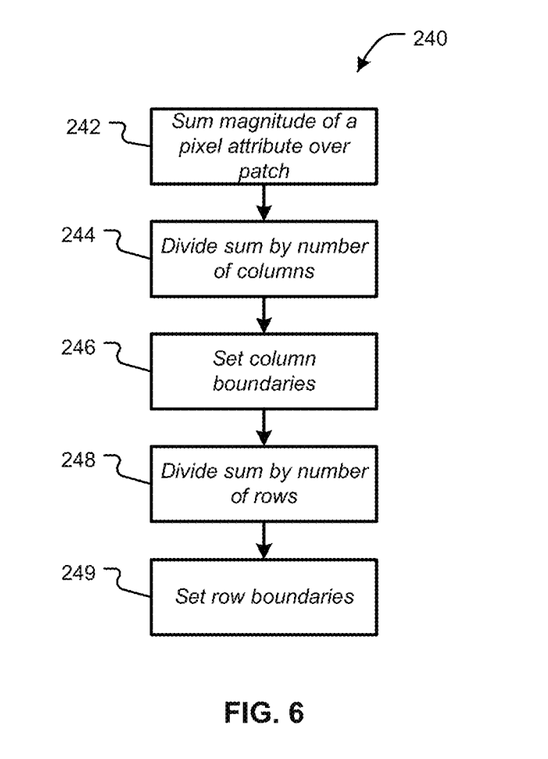
FIG. 6 is a flow chart showing one example of a process flow that may be executed by a computer vision system to create attribute-based cells in an image or patch.

FIG. 6 is a flow chart showing one example of a process flow 240 that may be executed by a computer vision system to create attribute-based cells in an image or patch. For example, the process flow 240 may be executed at 204 of the process flow 200 (FIG. 4) and/or at 224 of the process flow 220 (FIG. 5). In various examples, the process flow 240 describes how the computer vision system acts on an image and/or a patch selected from an image. The process flow 240 is described in the context of a patch, however, the actions of the process flow 240 may also be performed on any collection of pixels from an image up to and including a $2\pi$ radian or $4\pi$ steradian field-of-view image.

At 242, the computer vision system may sum a pixel attribute over the pixels in the patch. The pixel attribute may be any attribute describing a pixel including, for example, binary state, gradient vector values, etc. When the pixel attribute is a binary state (e.g., asserted or not asserted), then the sum of the pixel attribute over the patch may be the sum of asserted pixels in the patch. When the pixel attribute is a gradient vector, each pixel in the patch may have a gradient vector described by a direction and a magnitude. The sum of pixel attributes, in some examples, may be the sum of the magnitude of gradient vectors for each pixel in the patch.

At 244, the computer vision system may divide the sum of the pixel attributes by a number of columns to find a target sum of pixel attributes for pixels in each column. The number of columns may be selected in any suitable manner. At 246, the computer vision system may set column boundaries to equalize or approximately equalize the sum of the pixel attribute over the pixels in each column. In some examples, it may not be possible to exactly equalize the sum of pixel attribute for each column. For example, the total sum of the pixel attribute over the patch may not be divisible by the total number of columns. Also, in some examples, the distribution of patch properties over the y-axis of the image may not permit a perfect division among columns. When the sum of the pixel attribute cannot be completely equalized over all of the columns, the computer vision system may place the column boundaries to approximately equalize the sums of pixel attributes in each column. Any suitable technique may be used. For example, the computer vision system may find best-fit positions for row and/or column boundaries that comes closest to equalizing the sum of pixel attributes in each column and/or row. Examples for finding best-fit positions for row and/or column boundaries are described herein with respect to FIG. 7A. Also, in some embodiments, the computer vision system may apply a fuzzy boundary algorithm where pixels in the patch are partially assigned to multiple cells. Examples for applying a fuzzy boundary algorithms are provided herein with respect to FIG. 7B.

At 248, the computer vision system may divide the sum of pixel attributes over the patch by a number of rows to find a target sum of pixel attributes for pixels in each row. At 249, the computer vision system may set row boundaries to equalize or approximately equalize the sum of the pixel attributes over the pixels in each row. Row boundaries may be set in a manner similar to that described herein for column boundaries. Using FIG. 1 as an example, each column 21 may comprise approximately the same number of asserted pixels as other columns 21. Each row 27 may also comprise approximately the same number of asserted pixels as other rows 27. When the x and row boundaries are set, the patch may be divided into cells that may be utilized as described herein to train one or more classifiers and/or to recognize objects in an image.

The number of rows, columns, and cells used for any particular patch may be determined in any suitable manner. In some examples, the number of cells may correspond to the number and placement of features in the object to be detected. Alphanumeric characters, for example, may be adequately described by nine cells, as shown in FIG. 1. Also, in some examples, the number of rows, columns, and cells may be determined based on the descriptor algorithm. For example, different descriptor algorithms may return optimal descriptors for different types of images with a particular number of rows, columns, or cells. The optimal number of rows, columns, and/or cells for any particular descriptor may be determined experimentally by testing different numbers of columns, rows, and/or cells and determining which combination provides the best result. Also, available processing hardware may be a factor. For example, increasing the number of rows, columns, and cells may increase the required processing hardware and/or processing time to calculate attribute-based cells, descriptors and/or apply classifiers.

Figure 7A:
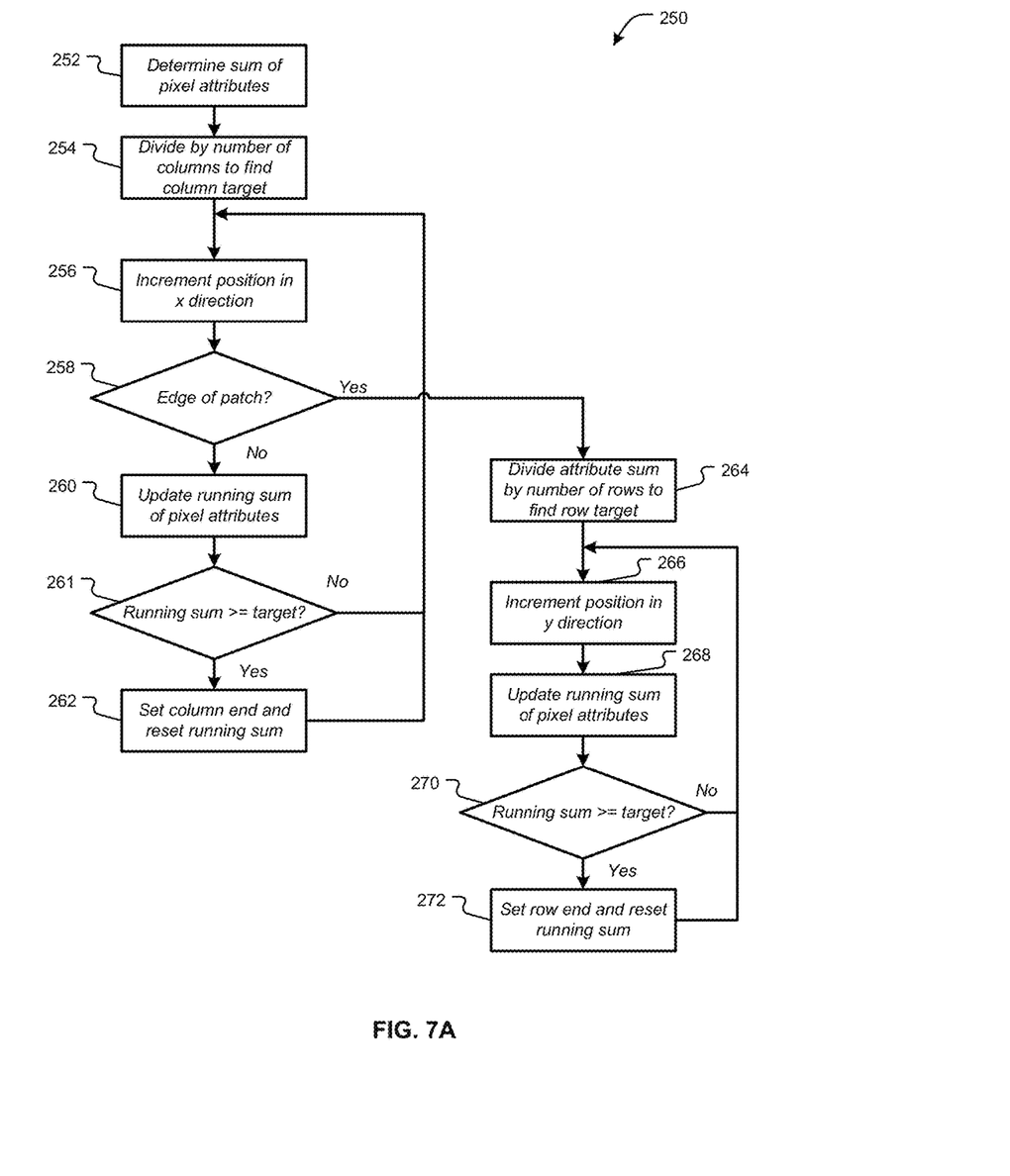
FIG. 7A is a flow chart showing another example of a process flow that may be executed by the computer vision system to create attribute-based cells in an image or patch.

FIG. 7A is a flow chart showing another example of a process flow 250 that may be executed by the computer vision system to create attribute-based cells in an image or patch. Like FIG. 6, FIG. 7A is described in the context of a patch, however the actions of the process flow may be performed on any collection of pixels from an image up to and including a $2\pi$ radian or $4\pi$ steradian field-of-view image. At 252, the computer vision system may determine a sum of pixel attributes in the patch, for example, similar to 242 above. At 254, the computer vision system may divide the sum of pixel attributes by the number of columns to determine a target sum of pixel attributes in each column. From there, the computer vision system may traverse the patch in the x direction from one side of the patch to the other while keeping a running sum of pixel attributes. Using the patch 12 of FIG. 1 as an example, the computer vision system may begin at a first edge of the patch 12 (e.g., the left or the right edge) and traverse to the opposite edge. For example, at 256, the computer vision system may increment its position in the x direction (e.g., by one pixel). At the outset, this may involve setting the position to the first edge.

At 258, the computer vision system may determine if its position is at the opposite edge of the patch 12. For example, this may involve determining whether the computer vision system has traversed the entire patch 12 in the x direction. If not, the computer vision system may update a running sum of pixel attributes at 260. This may include adding the sum of the pixel attribute over pixels at the current x-axis position to the running sum. Accordingly, the running sum may be a sum of attributes for any pixels having a position on the x-axis equal to the current position. If, at 261, the running sum is greater than or equal to the target sum of pixel attributes for the columns, the computer vision system may, at 262, set an end to the current column. For example, the computer vision system may write an indication of a column boundary (such as 23a and 23b in FIG. 1) to its current position in the x direction. As described herein, any other suitable manner of determining and describing the end of one column and the beginning of the next may be used. The computer vision system may also reset the running sum, for example, at 262, and then increment its position again at 256. If the running sum is not greater than or equal to the target sum of pixel attributes for the columns, the computer vision system may increment its position again at 256 without ending the current column or resetting the running sum. In this way, the computer vision system may determine columns with pixels having the same or approximately the same sum of pixel attributes.

When the computer vision system reaches the edge of the patch at 260, it may proceed to 264, where it may divide the sum of the attributes of all pixels in the patch by the desired number of rows to find a target attribute sum for rows. The computer vision system may then traverse the patch 12 in the y direction. At 266, the computer vision system may increment its y direction position. At 268, it may update a running sum of pixel attributes in they direction, which may include adding to the running sum a sum of pixel attributes for pixels at the current y position. If, at 270, the running sum is not greater than or equal to the target attribute sum for rows, the computer vision system may increment its y position at 266. If, at 270, the running sum is greater than or equal to the target attribute sum for rows, the computer vision system may, at 272, set an end to the current row, for example, by setting a row boundary at its current position in the y direction. The running sum may be reset, also at 272, and the computer vision system may increment its y position at 266. When the y position reaches an opposite edge of the patch 12, the process flow 250 may conclude.

Figure 7B:
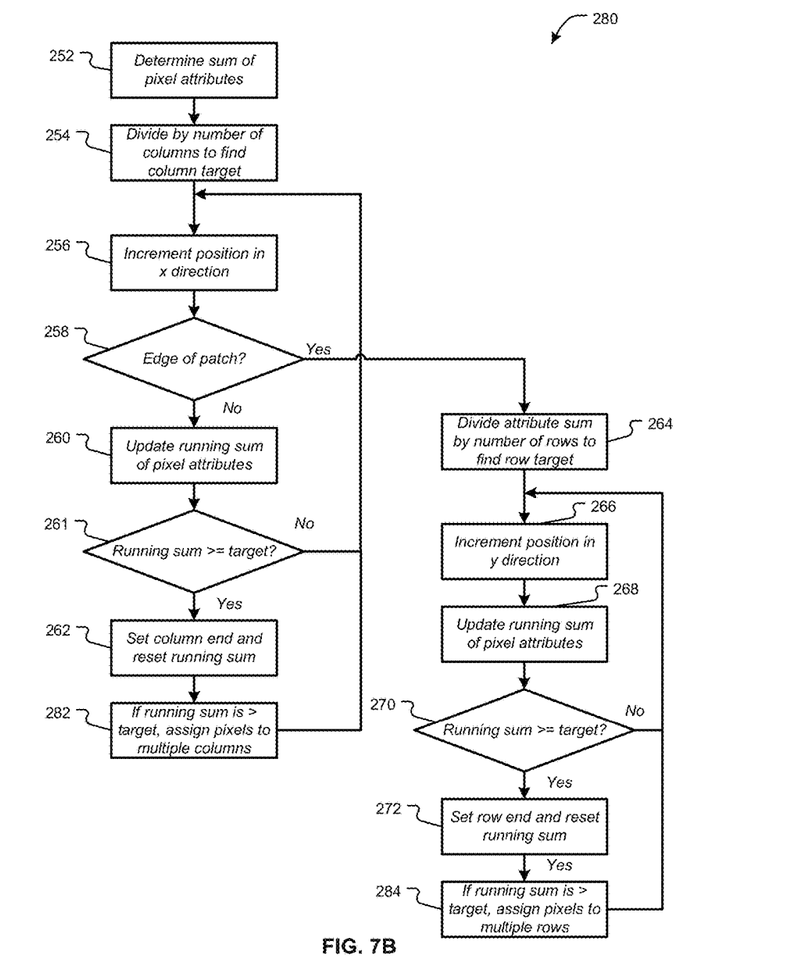
FIG. 7B is a flow chart showing yet another example of a process flow that may be executed by the computer vision system to create attribute-based cells in an image or patch.

FIG. 7B is a flow chart showing another example of a process flow 280 that may be executed by the computer vision system to create attribute-based cells in an image or patch. Like FIGS. 6 and 7A, FIG. 7B is described in the context of a patch, however the actions of the process flow 250 may be performed on any collection of pixels from an image up to and including a $2\pi$ radian or $4\pi$ steradian field-of-view image. The computer vision system may execute the process flow 280 in a manner similar to that of the process flow 250 of FIG. 6. If the running sum at 262 is greater than the target, however, the computer vision system may assign pixels from the current x position to multiple columns. This may be done in any suitable way. In some examples, the computer vision system may select from the pixels at the current x position a set of remainder pixels having a sum of attribute values that, when subtracted from current running sum, cause the running sum to equal the target. The set of remainder pixels may be added to the next column and, for example, the sum of the attribute for the set of remainder pixels may be added to the new running sum for the next column. In this way, different pixels at the x position may be assigned to different columns. Also, in some examples, the computer may assign partial pixels. For example, each pixel at the current x position having a non-zero value for the attribute may be partially assigned to the current column and partially assigned to the next column. The portion or percentage of a partially-assigned pixel to be included in the current column and the portion or percentage to be included in the next column may be determined in any suitable manner. For example, the computer vision system may find an overage amount describing the extent to which which the running sum exceeds the target value:

$$\text{Overage Amount} = \text{Running Sum} - \text{Column Target Value} \quad [1]$$

The computer vision system may find a ratio of the overage amount over the sum of the pixel attribute for pixels at the current x position:

$$\text{Ratio} = \frac{\text{Overage Amount}}{\sum \text{Pixel Attribute at } x \text{ position}} \quad [2]$$

The ratio may be applied to each pixel at the current x position. A portion of the pixel equal to the ratio may be considered to be in the next column, with the remainder considered to be in the current column. Accordingly, an amount equal to the overage amount may be added to the running sum for the next column. When a descriptor is found for the patch, the descriptor may consider partially-assigned pixels to be partially in one cell and partially in another cell (e.g., a cell in the next column.) For example, when a HOG descriptor is used, the computer vision system may find a histogram of gradient directions for a cell that includes the gradient directions for pixels completely within the cell. The computer vision system may add to the histogram for the cell partial gradient directions for pixels that are partially assigned. The portion of a cell's gradient direction that is added to the histogram may be equal to the portion of the pixel that is assigned to the cell. At 284, the computer vision system may assign partial pixels in the y direction in a manner similar to that described with respect to 282.

Figure 8A:
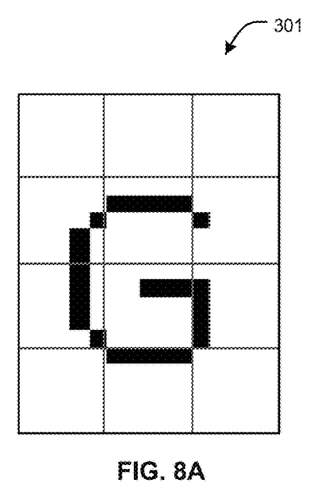
FIGS. 8A, 8B, 8C and 8D show example patches divided into cells to demonstrate example advantages of attribute-based cells for object recognition with offset objects.
Figure 8B:
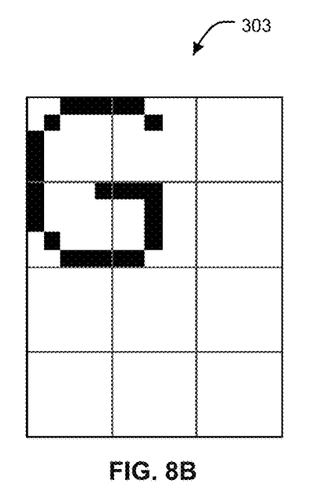

FIGS. 8A, 8B, 8C and 8D show example patches 301, 303, 305, 307 divided into cells to demonstrate example advantages of attribute-based cells for object recognition with offset objects. Although FIGS. 8A, 8B, 8C and 8D are described as patches, it will be appreciated that similar advantages may be achieved with images having a field-of-view as large as 360° and/or 4π steridans. Referring to FIG. 8A, the patch 301 depicts an object (e.g., the letter "G") centered in the patch with twelve (12) equally sized cells. For example, each cell comprises the same number of pixels. FIG. 8B illustrates a patch 303, also divided into twelve (12) equally sized cells and also depicting the letter "G." In FIG. 8B, however, the letter "G" is offset to top-left of the patch 303. As illustrated like portions of the letter "G" do not appear in the same cell of patch 301 as in patch 303. Accordingly, a classifier trained using cell descriptors from the patch 301 may be less likely to generate a match when compared to cell descriptors from the patch 303.

Figure 8C:
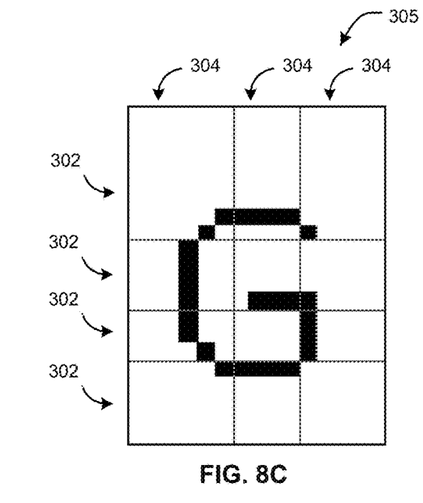
Figure 8D:
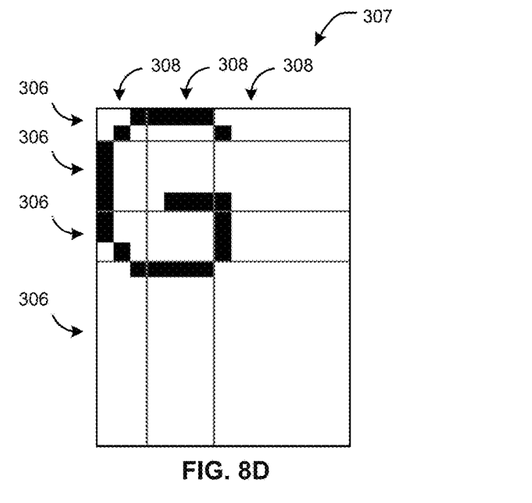

FIG. 8C illustrates a patch 305 depicting the letter "G" centered within the patch 305 in a position similar to the one shown in FIG. 8A. The patch 305, however, is divided into attribute-based cells determined, as described herein. For example, rows 302 may each comprise an equal or approximately equal number of asserted pixels. Similarly, columns 304 may each comprise an equal or approximately equal number of asserted pixels. FIG. 8D shows a patch 307 that depicts the letter "G" in the top-left offset position of FIG. 8B. In FIG. 8D, however, the patch 307 is divided into attribute-based cells, as described herein. Rows 306 may each comprise an equal or approximately equal number of asserted pixels. Similarly, columns 308 may comprise an equal or similarly equal number of asserted pixels. As can be clearly seen, corresponding cells of the patch 305 and the patch 307 comprise similar patterns of asserted pixels despite the difference in the offset of the letter "G." For example, the pattern of asserted pixels in the top left cell of the patch 305 is similar to the pattern of asserted pixels in the top left cell of the patch 307. Accordingly, a classifier trained using cell descriptors from a patch with attribute-based cells, such as the patch 305, may be more likely to generate a match when compared to cell descriptors from another patch having attribute-based descriptors, such as the patch 307.

Figure 9A:
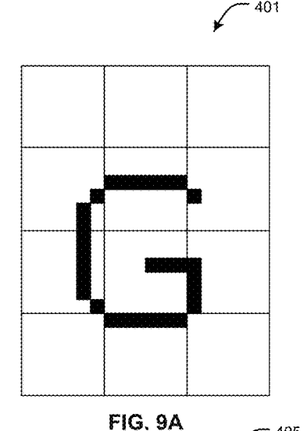
FIGS. 9A, 9B, 9C and 9D show example patches divided into cells to demonstrate example advantages of attribute-based cells for object recognition with elongated objects.
Figure 9B:
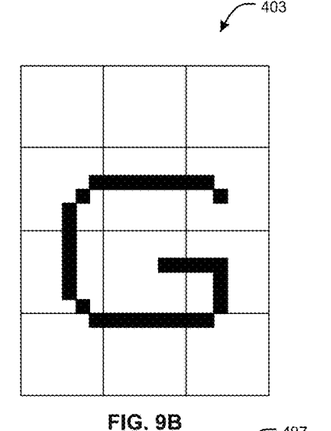

FIGS. 9A, 9B, 9C and 9D show example patches 401, 403, 405, 407 divided into cells to demonstrate example advantages of attribute-based cells for object recognition with elongated objects. Although FIGS. 9A, 9B, 9C and 9D are described as patches, it will be appreciated that similar advantages may be achieved with images having a field-of-view as large as 460° and/or 4π steridans. Referring to FIG. 9A, the patch 401 depicts an object (e.g., the letter "G") centered in the patch with twelve (12) equally sized cells. For example, each cell comprises the same number of pixels. FIG. 9B illustrates a patch 403, also divided into twelve (12) equally sized cells and also depicting the letter "G." In FIG. 9B, however, the letter "G" is elongated in the x or horizontal direction. Elongation of this type may occur, for example, if a scanned document is not flat against a scanner glass, if the patch 403 is captured form an image where the camera position is not square to a sign or other thing on which the character (e.g., the letter "G") appears. As illustrated like portions of the letter "G" do not appear in the same cell of patch 401 as in patch 403. Accordingly, a classifier trained using cell descriptors from the patch 401 may be less likely to generate a match when compared to cell descriptors from the patch 403.

Figure 9C:
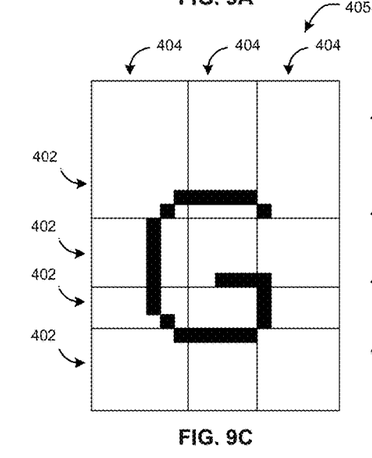
Figure 9D:
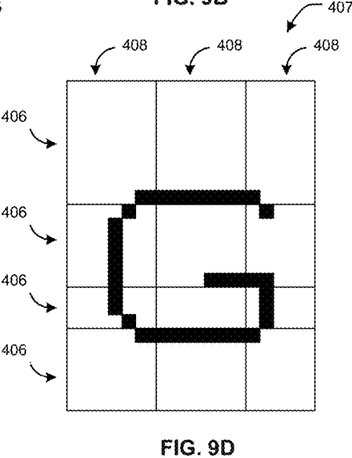

FIG. 9C illustrates a patch 405 depicting the letter "G" centered within the patch 405 in a position similar to the one shown in FIG. 9A. The patch 405, however, is divided into attribute-based cells determined, as described herein. For example, rows 402 may each comprise an equal or approximately equal number of asserted pixels. Similarly, columns 404 may each comprise an equal or approximately equal number of asserted pixels. FIG. 9D shows a patch 407 that depicts the letter "G" in the top-left offset position of FIG. 9B. In FIG. 9D, however, the patch 407 is divided into attribute-based cells, as described herein. Rows 406 may each comprise an equal or approximately equal number of asserted pixels. Similarly, columns 408 may comprise an equal or similarly equal number of asserted pixels. As can be clearly seen, corresponding cells of the patch 405 and the patch 407 comprise similar patterns of asserted pixels despite the elongation of the letter "G" in patch 407. Accordingly, a classifier trained using cell descriptors from a patch with attribute-based cells, such as the patch 405, may be more likely to generate a match when compared to cell descriptors from another patch having attribute-based descriptors, such as the patch 407.

Figure 10:
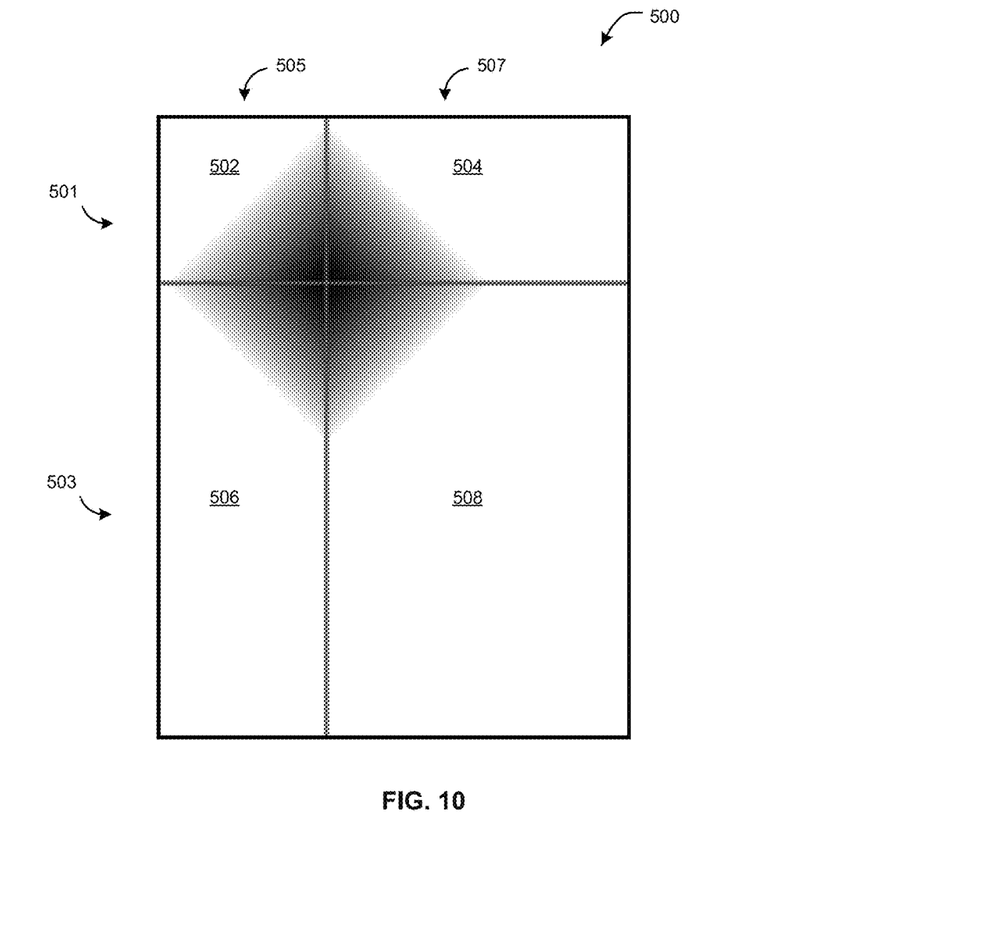
FIG. 10 shows an example patch divided into attribute-based cells considering pixel gradient vectors.

FIG. 10 shows an example patch 500 divided into attribute-based cells considering pixel gradient vectors. The patch 500 is divided into four cells 502, 504, 506, 508. As described herein, the sum of gradient vectors for pixels in the row 501 may be equal or approximately equal to the sum of gradient vectors for pixels in the row 503. Similarly, the sum of gradient vectors for pixels in the column 505 may be equal or approximately equal to the sum of gradient vectors for pixels in the column 507.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer vision system for object recognition in an image, the system comprising:
   at least one processor and operatively-associated memory, wherein the at least one processor is programmed to:
      receive a first patch comprising a plurality of pixels, wherein the first patch comprises at least a portion of the image;
      determine a first total number of columns in a plurality of columns in the first patch, wherein the plurality of columns are vertically-arranged;
      determine a column target sum of a pixel attribute by dividing a sum of values of the pixel attribute over the plurality of pixels by the first total number of columns in the plurality of columns;
      determine positions of the plurality of columns in the first patch based at least in part on the column target sum of the pixel attribute;
      determine a second total number of rows in a plurality of rows in the first patch, wherein the plurality of rows are horizontally-arranged;
      determine a row target sum of the pixel attribute by dividing the sum of values of the pixel attribute over the plurality of pixels by the second total number of rows in the plurality of rows;
      determine positions of the plurality of rows in the first patch based at least in part on the row target sum of the pixel attribute wherein the plurality of columns and the plurality of rows divide the first patch into a plurality of cells; and
      determine a descriptor of the first patch, wherein determining the descriptor is based at least in part on the plurality of cells; and
      apply a classifier describing a first object type to the descriptor.

2. The system of claim 1, wherein the at least one processor is programmed to determine the positions of the plurality of columns by:
   adding a first sum of the pixel attribute over a first set of pixels in the first patch at a first horizontal axis position to a second sum of the pixel attribute over a second set of pixels in the first patch at a second horizontal axis position to find a running sum;

adding to the running sum a third sum of the pixel attribute over a third set of pixels in the first patch at a third horizontal axis position;

determining that the running sum is greater than or equal to the column target sum of the pixel attribute; and set an end to a first column at the third horizontal axis position.

3. The system of claim 1, wherein each pixel attribute is a binary state of a corresponding pixel of the plurality of pixels, and wherein the sum of values of the pixel attribute over the plurality of pixels is equal to a total number of pixels in the first patch that are asserted.

4. The system of claim 3, wherein the at least one processor is further programmed to:

identify a set of pixels in the first patch that have a greyscale value exceeding a threshold greyscale value; and store an indication that pixels in the set of pixels are asserted.

5. The system of claim 1, wherein the at least one processor is further programmed to divide the image into a plurality of patches, wherein the plurality of patches includes the first patch, and wherein each patch in the plurality of patches depicts a character.

6. The system of claim 1, wherein the plurality of pixels are arranged in a grid, and wherein the at least one processor is programmed to determine the positions of the plurality of columns by:

finding a histogram indicating a sum of pixel properties by position on a horizontal axis of the grid; and setting a plurality of column boundaries to equalize an area under the histogram in each of the plurality of columns.

7. The system of claim 1, wherein the computer vision system further comprises at least one image sensor, and the at least one processor is programmed to receive the first patch from the at least one image sensor.

8. The system of claim 1, wherein the first patch is received from a first computing device, and wherein the at least one processor is further programmed to:

receive a second patch from a second computing device, the second patch comprising a second plurality of pixels selected from a second image;

determine second positions of a plurality of second patch columns in the second patch based at least in part on a second patch column target sum of the pixel attribute, wherein the second patch column target sum is a first sum of values of the pixel attribute over the second plurality of pixels divided by a third total number of columns in the plurality of second patch columns;

determine second positions of a plurality of second patch rows in the second patch based at least in part on a second patch row target sum of the pixel attribute, wherein the second patch row target sum is a second sum of values of the pixel attribute over the second plurality of pixels divided by a fourth total number of rows in the plurality of second patch rows, and wherein the plurality of second patch columns and the plurality of second patch rows divide the second patch into a second plurality of cells;

determine a second patch descriptor of the second patch based at least in part on the second plurality of cells; and applying the classifier to the second patch descriptor.

9. The system of claim 1, wherein the at least one processor is programmed to determine the positions of the plurality of columns in the first patch by assigning a first pixel at a first horizontal axis position to a first column selected from the plurality of columns and assigning a second pixel at the first horizontal axis position to a second column selected from the plurality of columns.

10. The system of claim 1, wherein the at least one processor is programmed to determine the positions of the plurality of columns in the first patch by assigning a first portion of a first pixel of the plurality of pixels to a first column and a second portion of the first pixel to a second column.

11. The system of claim 10, wherein the at least one processor is programmed to determine the descriptor of the first patch by considering a first portion of an attribute of the first pixel with a first cell selected from the plurality of the cells and a second portion of the attribute of the first pixel with a second cell selected from the plurality of cells.

12. The system of claim 1, wherein the image is a test image depicting an object of the first object type, and wherein the at least one processor is further programmed to modify the classifier to match the descriptor for the first patch.

* * * * *